July 3, 1962  A. L. GODSHALL  3,041,873
LOAD TESTING APPARATUS
Filed Jan. 25, 1960  2 Sheets-Sheet 1

INVENTOR.
ALBERT L. GODSHALL
BY
ATTORNEYS

INVENTOR.
ALBERT L. GODSHALL
BY

ATTORNEYS 3,041,873
LOAD TESTING APPARATUS
Albert L. Godshall, Lansdale, Pa., assignor to Ametek, Inc., New York, N.Y., a corporation of Delaware
Filed Jan. 25, 1960, Ser. No. 4,269
8 Claims. (Cl. 73—93)

This invention relates to load testing apparatus wherein a load is applied to a structure being tested and means are provided for indicating the magnitude of this load.

In the use of load testing apparatus of this type it is essential that the load be applied in the same manner to each of the tested structures so that an accurate comparison may be made. It is also desirable that an accurate reading may be quickly and easily obtained and that the means for applying the force may be readily moved into the testing position. Durability and simplicity of construction are also desirable features in load testing apparatus.

The general object of this invention is to provide a load testing device which will accomplish the features discussed above.

Other objects and features of this invention will become apparent from the consideration of the following description taken in connection with the accompanying drawings wherein.

Figure 1:
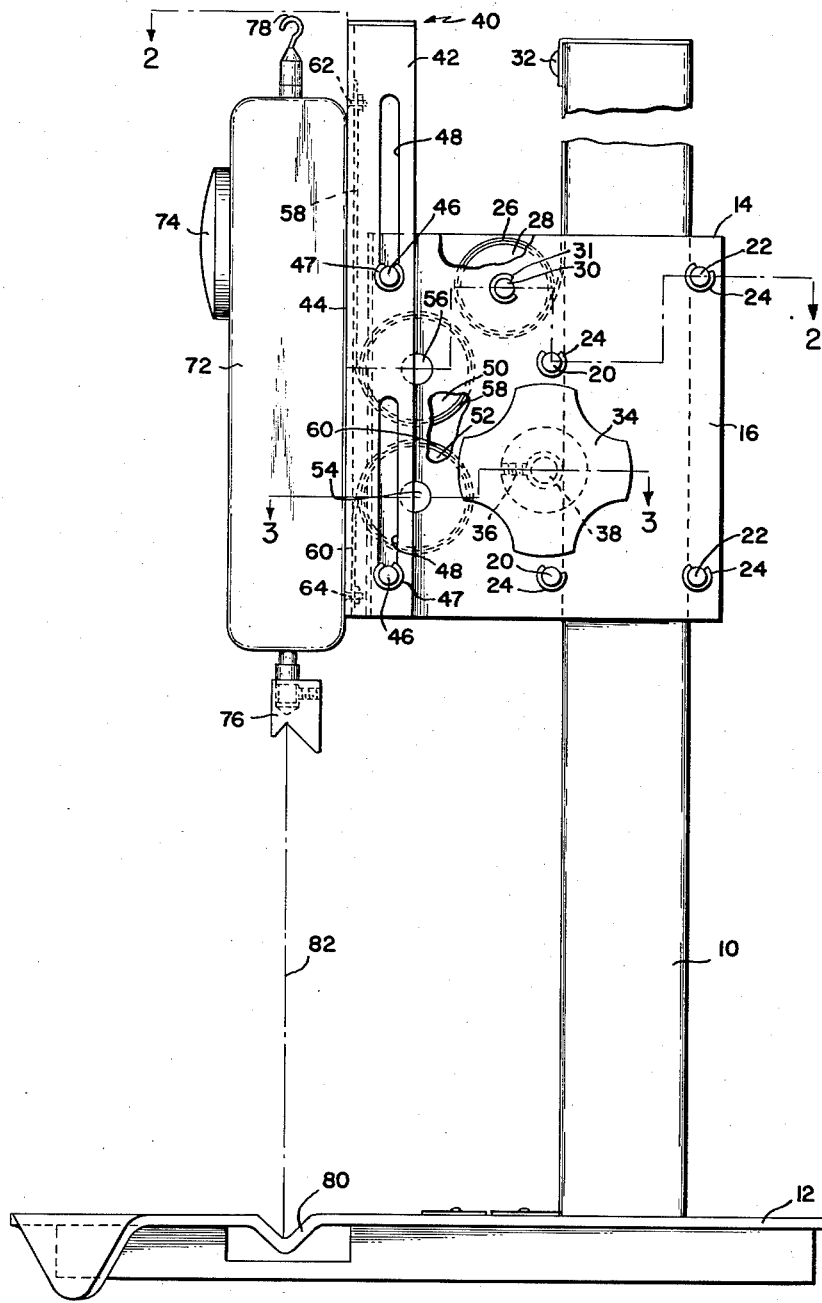
FIGURE 1 is an elevational view of a preferred embodiment of the invention.

Referring to the drawings, a load testing device in accordance with this invention is shown embodied in a tester for applying compressive loads to flat folded paperboad cartons to measure the force needed to open these cartons. Although the tester is shown in a vertically positioned, compression apparatus, it will be apparent that this tester may have various uses wherever the application of a force is desired. For example, it may be easily adapted for use in tension or in a horizontal position.

The tester comprises a substantially square, hollow column 10 vertically supported at its lower end on a base 12 adapted to rest on a substantially flat surface. A carriage 14 is mounted on column 10 for movement longitudinally thereof. Carriage 14 is comprised of a pair of oppositely disposed sidewalls 16 joined by an endwall 18 and is guided for longitudinal movement on column 10 by two pairs of shafts 20 and 22.

Figure 2:
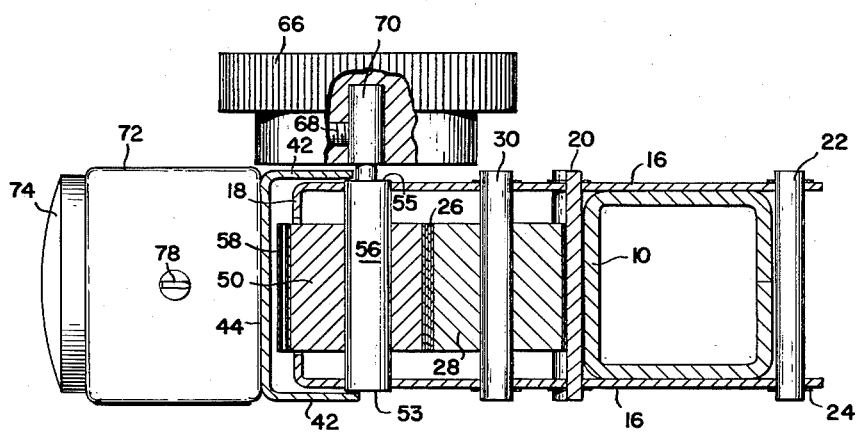
FIGURE 2 is a sectional view taken on line 2—2 of FIGURE 1.

Shafts 20 and 22 are rotatably mounted in sidewalls 16 in parallel relation and are spaced to receive column 10 therebetween as is best shown in FIGURE 2. Suitable retaining rings 24 are provided to prevent axial movement of shafts 20 and 22 to thereby retain the same in sidewalls 16. Sidewalls 16 are spaced to receive column 10 therebetween.

The means for movably mounting carriage 14 on column 10 comprises a normally tightly coiled ribbon spring 26 partly coiled on drum 28 which is fixedly mounted on a shaft 30 rotatably mounted in sidewalls 16. Suitable retaining rings 31 are provided to prevent axial movement of shaft 30 to thereby retain shaft 30 in sidewalls 16. The free end of spring 26 is connected to the upper end of column 10 as by rivet 32. Such springs are also known as noncumulative force springs and are also sometimes referred to as constant force springs. Suitable springs are disclosed, for example, in Patent No. 2,609,-191, issued September 2, 1959, and Patent No. 2,609,192, issued September 2, 1959. Spring 26 preferably has a low or zero gradient and counterbalances carriage 14 and the parts supported thereby, which parts will be described hereinafter. Spring 26 is designed to exert a force to slightly overbalance the carriage 14 and the parts supported thereby to cause the same to drift slowly to the top of column 10 if no restrictive force is applied to carriage 14.

Figure 3:
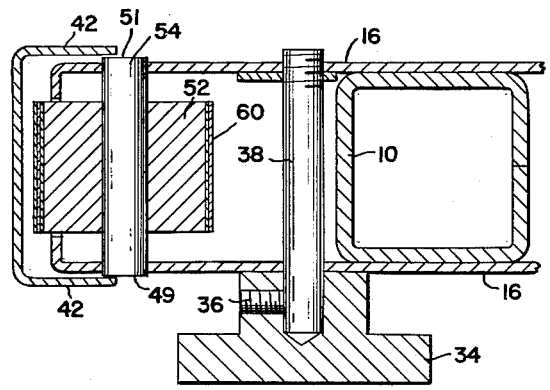
FIGURE 3 is a sectional view taken on line 3—3 of FIGURE 1.

As is best shown in FIGURE 3, a locking knob 34 which, by means of a screw 36, is fixedly mounted on one end of a shaft 38 rotatably mounted in sidewalls 16. The other end of shaft 38 threadedly engages the sidewall 16 which supports such end. Hence, rotation of knob 34 may be utilized to clamp sidewalls 16 on column 10 by means of the friction lock created therebetween.

An elongated member 40 is mounted on carriage 14 for linear movement in a longitudinal direction adjacent end wall 18. Member 40 comprises a pair of oppositely disposed sides 42 joined by a base portion 44 and is constructed to enclose end wall 18 of carriage 14. Member 40 is guided for linear movement by a pair of shafts 46 mounted in walls 16 to project outwardly therefrom into cooperating longitudinal slots 48 in sides 42. Suitable retaining rings 47 are provided to prevent axial movement of shafts 46 to thereby retain the same in sidewalls 16.

A pair of drums 50 and 52 are fixedly mounted on shafts 54 and 56, respectively, rotatably mounted in sides 16 in parallel relation adjacent end wall 18. As is shown in FIGURE 2, axial movement of shaft 56 is restricted by sides 42 which cooperate with one end 53 and a shoulder 55 of shaft 56 to thereby retain shaft 56 in sidewalls 16. As is shown in FIGURE 3, axial movement of shaft 54 is also restricted by sides 42 which cooperate with the ends 49 and 51 of shaft 54 to thereby retain shaft 54 in sidewalls 16. A pair of normally tightly coiled ribbon springs 58 and 60 of a type similar to spring 26 are partially coiled on drums 50 and 52, respectively. The free end of spring 58 is secured to member 40 adjacent the upper end thereof by suitable means such as screw 62. The free end spring 60 is secured to member 40 adjacent the lower end thereof by suitable means such as a screw 64.

By this construction, spring 60 biases member 40 upwardly and spring 58 biases member 40 downwardly. Spring 60 is designed to exert a greater force than spring 58 whereby member 40 is normally maintained in a reference or zero position which is shown in FIGURE 1. This reference or zero position may be determined by the stop provided by the lower ends of slots 48 or may be in accordance with an equilibrium position which is attained when spring 60 is in its completely coiled position.

Manually operable means are provided for rotating drum 50 to coil spring 58 to thereby cause linear motion of member 40. Such means comprises a knob 66 fixedly mounted, by means of a locking screw 68, on an end 70 of shaft 56 extending outwardly of carriage 14.

A force gauge 72 is secured to member 40 as by being welded onto base portion 44 for linear movement with member 40. Force gauge 72 may be of any suitable type such as, for example, the force measuring device disclosed in Patent No. 2,612,042, issued September 30, 1952. Force gauge 72 has a dial 74 for indicating the applied force, a notched plunger 76 for the application of a compressive load and a hooked end 78 for the application of a tension load. In the embodiment of the invention shown in FIGURE 1, force gauge 72 is mounted for the application of a compressive load with notched plunger 76 in alignment with a notched portion 80 in base 12, as is shown by line 82. By this arrangement, the testing device is adapted for the application of a compressive load to a folded carton which may be positioned between notched plunger 76 and notched portion 80 on base 12.

*Operation*

In operation, carriage 14 is moved vertically on column 10 against the bias of spring 26 to the testing position and is then clamped in this position by the action of knob 34. The testing position may be indicated by index marks on column 10 or may be determined by the carton to be tested, the lower end of which is placed in notched portion 80 to indicate the testing position when notched plunger 76 engages the upper end thereof. If a plurality of similar cartons are to be tested, the carriage may be left in this position during the successive testing operation.

The force gauge 72 is then depressed by the manual operation of knob 66 to cause the extended portion of spring 58 to be coiled to thereby pull member 40 and force gauge 72 downwardly. The compressive load applied to the cartons by this downward movement is indicated by the force gauge 72. In the illustrated device in accordance with the invention, the downward movement of force gauge 72 is continued until the flat folded carton collapses. The force gauge 72 will indicate the "breaking-load" of the carton.

After each individual carton is tested, knob 66 is released to allow the return of member 40 and force gauge 72 to the initial or reference testing position under the action of spring 60 which returns to its coiled position from an extended position. Spring 60 was previously moved to this extended position by the action of member 40 as it is moved downwardly from the reference position by reason of the rotation of knob 66.

After all the cartons have been tested, the clamping pressure locking carriage 14 in the testing position is released by the rotation of knob 34. Since spring 26 slightly overbalances the carriage 14 and the parts supported thereby, spring 26 will recoil and cause the entire carriage assembly to drift slowly to the top of column 10 if there is no manual restrictive force applied thereto.

It is to be understood that although only one embodiment of this invention has been shown and described for purposes of illustration, the invention can be variously embodied and changes can be made in the construction and arrangement of parts without departing from the scope of the invention. It is not desired to be limited except as set forth in the following claims.

What is claimed is:

1. A load testing device comprising a support means and means mounted on said support means for applying a load to the apparatus to be tested including a member, means guiding said member for linear movement, means mounted on said member for engagement with the apparatus to be tested for measuring the applied load, and means for actuating said member through a linear movement to apply a load through said measuring means to the apparatus to be tested said means for actuating said member through a linear movement comprising a tightly coiled ribbon spring mounted for coiling and uncoiling movement, an extending free end of said ribbon spring being connected to said member, and a spring means connected to said member to urge said member in a direction opposite to said ribbon spring toward a reference position with a bias which overcomes the bias of said ribbon spring.

2. A load testing device comprising support means, a carriage, means interconnecting said carriage and said support means and movably mounting said carriage on said support means for movement relative thereto to position said carriage in a plurality of testing positions, a member, means mounting said member on said carriage and guiding the same for linear movement, a tightly coiled ribbon spring mounted for coiling and uncoiling movement on said carriage, the free end of said ribbon spring being secured to said member, force measuring means mounted on said member for engagement with the apparatus to be tested to measure the magnitude of the applied load, and means operatively connected to said ribbon spring to cause coiling movement thereof to thereby actuate said member linearly to apply a load to the apparatus to be tested.

3. A device as claimed in claim 2 including means for locking said carriage in a testing position.

4. A device as claimed in claim 2 wherein said means for mounting said carriage on said support means comprises a drum rotatably mounted on said carriage and a tightly coiled ribbon spring mounted on said drum, the free end of said last-named ribbon spring being connected to said support means.

5. A load testing device comprising a movably mounted carriage, means for locking said carriage in a testing position, a member mounted on said carriage for linear movement, a tightly coiled ribbon spring mounted on said carriage for coiling and uncoiling movement, an extended free end of said spring being connected to said member, a spring means mounted on said carriage connected to said member, said spring means exerting a greater force on said member than said ribbon spring to urge said member to a reference position, force indicating means mounted on said member and adapted to be engageable with the apparatus to be tested, and means operatively connected to said ribbon spring and movable to coil the same to thereby actuate said member linearly to apply a load through said force indicating means to the apparatus to be tested.

6. A device as claimed in claim 5 wherein said spring means comprises a tightly coiled ribbon spring mounted on said carriage for coiling and uncoiling movement, an extended free end of said last-named ribbon spring being connected to said member.

7. A load testing device comprising a movably mounted carriage, means for locking said carriage in a testing position, a member mounted on said carriage for linear movement, a drum rotatably mounted on said carriage, a tightly coiled ribbon spring mounted on said drum for coiling and uncoiling movement, an extended free end of said ribbon spring being connected to said member, a spring means mounted on said carriage and connected to said member, said spring means exerting a greater force on said member than said ribbon spring to urge said member to a reference position, force indicating means on said member adapted to be engageable with the apparatus to be tested, and manually operable means operatively connected to said drum for rotating the same to cause coiling of said ribbon spring to actuate said member through a load applying movement from said reference position, said spring means causing return of said member to the reference position thereof upon release of said manually operable means after a load applying movement.

8. A device as claimed in claim 7 wherein said spring means comprises a tightly coiled ribbon spring mounted on said carriage for coiling and uncoiling movement, an extended free end of said last-named ribbon spring being connected to said member.

References Cited in the file of this patent

UNITED STATES PATENTS

| | | |
|---|---|---|
| 1,908,412 | Domina | May 9, 1933 |
| 1,977,546 | Fornelius | Oct. 16, 1934 |
| 2,609,193 | Foster | Sept. 2, 1952 |
| 2,919,500 | Simpson et al. | Jan. 5, 1960 |
| 2,922,302 | Kernan | Jan. 26, 1960 |